(12) United States Patent
Watts

(10) Patent No.: US 8,675,266 B2
(45) Date of Patent: Mar. 18, 2014

(54) DOCUMENT IMAGING SYSTEMS INCLUDING PLATEN UNDERSIDE CLEANING AND COMPONENT CLEANING

(75) Inventor: Christopher F. D. Watts, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 20 days.

(21) Appl. No.: 13/570,633

(22) Filed: Aug. 9, 2012

(65) Prior Publication Data

US 2014/0043660 A1    Feb. 13, 2014

(51) Int. Cl.
*H04N 1/04*    (2006.01)

(52) U.S. Cl.
USPC ........... 358/474; 358/497; 358/498; 358/475; 399/345; 271/9.06

(58) Field of Classification Search
USPC ................ 358/474, 498, 497, 496, 475, 509; 399/345, 389; 271/9.06, 104, 265.02, 271/105
See application file for complete search history.

(56) References Cited

U.S. PATENT DOCUMENTS

| | | | |
|---|---|---|---|
| 4,635,072 A * | 1/1987 | Conrads et al. | 347/231 |
| 5,249,255 A * | 9/1993 | Fuqua et al. | 392/412 |
| 5,339,139 A * | 8/1994 | Fullerton et al. | 399/203 |
| 5,534,989 A | 7/1996 | Rubscha et al. | |
| 5,552,812 A * | 9/1996 | Ebinuma et al. | 347/34 |
| 5,722,029 A * | 2/1998 | Tomidokoro et al. | 399/389 |
| 6,166,394 A | 12/2000 | Rubscha | |
| 6,350,072 B1 | 2/2002 | Nunes et al. | |
| 6,393,161 B1 | 5/2002 | Stevenson et al. | |
| 6,522,431 B1 | 2/2003 | Pitts et al. | |
| 6,593,995 B1 * | 7/2003 | Hogestyn | 355/41 |
| 7,667,878 B2 | 2/2010 | Korhonen et al. | |
| 7,755,808 B2 | 7/2010 | Kelly et al. | |
| 8,543,044 B2 * | 9/2013 | Wazumi et al. | 399/323 |
| 2002/0149804 A1 | 10/2002 | Mick et al. | |
| 2009/0153814 A1 | 6/2009 | Langrel et al. | |

* cited by examiner

*Primary Examiner* — Negussie Worku
(74) *Attorney, Agent, or Firm* — Fay Sharpe LLP

(57) ABSTRACT

Disclosed are document imaging systems and methods which provide cleaning and cooling of various components associated with an image scanning system. According to one exemplary embodiment of this disclosure, provided is a document imaging system including a flexible, accordion style, duct which draws air through a vacuum slot between a light source and optical sensor associated with the scanning system. The resulting air flow provides cleaning of the imaging platen and provides cooling/cleaning of the light source and optical sensor.

20 Claims, 7 Drawing Sheets
(1 of 7 Drawing Sheet(s) Filed in Color)

DOCUMENT IMAGING SYSTEMS INCLUDING PLATEN UNDERSIDE CLEANING AND COMPONENT CLEANING

BACKGROUND

This disclosure relates to optical scanning devices. Specifically, provided are systems and methods to clean the underside of a platen, as well as cool components, such as a light source and optical sensor, operatively associated with a scanning device.

Contamination of imaging stations associated with a document handler, such as a manual or document feeder, is a long standing problem. In particular, the platen glass area over which document sheets are manually or sequentially fed for scanning can become contaminated, such as by dirt, paper lint, ink, toner, etc., which can cause objectionable line or spots on a rendered image of the scanned document.

In addition, contamination of the underside of the platen glass area can also become contaminated by dust, dirt, ink, toner, etc., which also causes objectionable line or spots on a rendered image of the scanned document.

Recognition of the problems of imaging area contamination and partial electronic solutions are discussed in U.S. Pat. Nos. 6,393,161 and 6,522,431. An example of a typical CVT document feeding and imaging system is disclosed in U.S. Pat. Nos. 5,534,989, 6,166,394, or 6,350,072, incorporated by reference herein, although not limited thereto. As shown therein an automatic CVT document feeder and imager may desirably be integrally combined with a large platen stationary document scanner for documents not desired to be fed through the CVT system, and the CVT system can use a small area of the same platen or a separate platen for its imaging station, and either can be lifted up to expose either of the two separate platen imaging areas. As described and shown therein, typically these units share the same scanning bar and scanning lamp unit, which moves under the CVT platen area during its CVT imaging operation, but moves over and parks on the opposite side of the large platen area provided for stationary document scanning whenever the platen cover, CVT unit, or both are opened, since that opening normally indicates that the user is planning to place a document for scanning on the large stationary document platen.

Currently, in order to clean the underside of an imaging platen, a service call needs to be placed, whereby a technician must remove the platen to manually clean the underside.

Needed is a more automatic method and system of cleaning the platen underside.

INCORPORATION BY REFERENCE

U.S. Patent Application Publication No. 2002/0149804, by Mick et al., published Oct. 17, 2002 and entitled "METHOD AND APPARATUS FOR CLEANING THE UNDERSIDE OF SCANNER PLATEN";

U.S. Patent Application Publication No. 2009/0153814, by Langrel et al., published Jun. 18, 2009;

U.S. Pat. No. 5,339,139, by Fullerton et al., issued Aug. 16, 1994 and entitled "DOCUMENT FEEDER WITH POSITIVE DOCUMENT REMOVAL FROM IMAGING PLATEN";

U.S. Pat. No. 5,534,989, by Rubscha et al., issued Jul. 9, 1996 and entitled "SEPARATING DOCUMENT TRAYS IMAGING SYSTEM";

U.S. Pat. No. 6,166,394, by Rubscha, issued Dec. 26, 2000 and entitled "DUAL BACKGROUND DOCUMENT SCANNER TO ELIMINATE HOLE PRINTOUTS";

U.S. Pat. No. 6,393,161, by Stevenson et al., issued May 21, 2002 and entitled "SOFTWARE SYSTEM FOR MINIMIZING IMAGE DEFECTS IN A HARD-COPY INPUT SCANNER";

U.S. Pat. No. 6,522,431, by Pitts et al., issued Feb. 18, 2003 and entitled "SYSTEM FOR MINIMIZING IMAGE DEFECTS IN A HARD-COPY INPUT SCANNER";

U.S. Pat. No. 6,593,995, by Hogestyn, issued Jul. 15, 2003 and entitled "DUAL MODE DOCUMENT SCANNER WITH VARIABLE PLATEN LEVEL TRANSITION";

U.S. Pat. No. 6,350,072, by Nunes et al., issued Feb. 26, 2003 and entitled "PRINTER WITH PLURAL MODE INTEGRAL MODULE FOR DOCUMENT HANDLING PRINT OUTPUT AND PRINT DUPLEX INVERSION";

U.S. Pat. No. 7,667,878, by Korhonen et al., issued Feb. 23, 2010 and entitled "CVT DOCUMENT SCANNER CONTAMINATION DIAGNOSTIC ROUTINE"; and U.S. Pat. No. 7,755,808, by Kelly et al., issued Jul. 13, 2010 and entitled "DOCUMENT SCANNER DUST DETECTION SYSTEMS AND METHODS"; are all incorporated herein by reference in their entirety.

BRIEF DESCRIPTION

In one embodiment of this disclosure, described is a document imaging system. The document imaging system is comprised of a document handler; an imaging platen operatively associated with the document handler, the imaging platen including a longitudinal axis, a lateral axis, a top surface and an underside surface; a tub attached to the imaging platen, whereby the underside surface is substantially sealed within the tub, the tub including an inside cavity, an outside surface, an air inlet and an air outlet; a light source aligned along the lateral axis of the imaging platen and located within the inside cavity of the tub; an optical sensor longitudinally offset from the light source and aligned along the lateral axis of the imaging platen and located within the inside cavity of the tub; a slot aligned along the lateral axis of the imaging platen and bounded by the light source and optical sensor, the slot located within the inside cavity of the tub and operatively connected to the air outlet; a blower operatively connected to the air outlet, wherein the blower draws air from the air inlet, along the underside surface of the imaging platen, through the slot and through the air outlet to provide one or more of cooling and cleaning of any surfaces within the tub.

In another embodiment of this disclosure, a document imaging system is described with is comprised of a document handler; an imaging platen operatively associated with the document handler, the imaging platen including a top surface and an underside surface; a tub attached to the imaging platen, whereby the underside surface is substantially sealed within the tub, the tub including an inside cavity, an outside surface, an air inlet and an air outlet; a light source and optical sensor assembly located within the tub inside cavity, the light source and optical sensor assembly configured to scan a document placed on the imaging platen; and a blower operatively connected to the air outlet and the light source and optical sensor assembly, wherein the blower draws air from the air inlet, across the imaging platen underside, across the light source and optical sensor assembly, and out the air outlet.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION

An image scanning system has several conflicting requirements, as the optics are sensitive to dust and contamination, and the system needs to be sealed to keep the optics clean. Conversely, the light source and electronics within the scanner needs external air for cooling, which may contain contamination. Contamination settles on the underside of the platen glass blocking the scan bar's view of the original or on the optical sensor itself. Furthermore, conventional scanning systems have no cooling or cleaning strategy within the scanner system, whereby the life of many electronic components is shortened. In addition, a detrimental effect on the scanned image quality can be the result of improper cooling/cleaning.

The disclosed embodiments utilize a special arrangement of vacuum ducting attached to an expandable tubing material that can compress to allow a scan bar to return home and stretch, and to allow the scan bar to park in the CVT position. The vacuum ducting provides a manner to induce an airflow to cool the scan bar light source and the scan bar lens optical sensor, and clean the underside of the platen glass.

One feature of this disclosure is the use of an integral forced cooling of the scan bar combined with platen glass cleaning and concertina ducting to maintain full scanning mobility/functionality.

Figure 1:
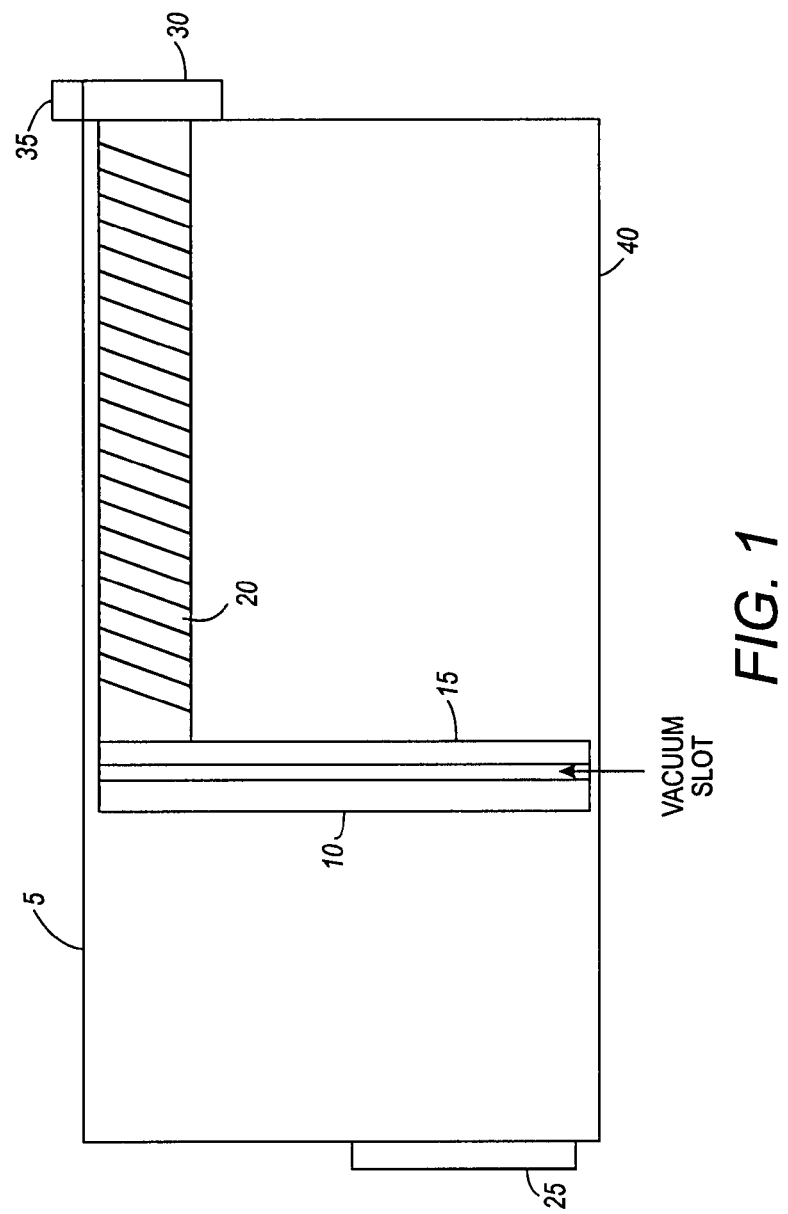
FIG. 1 is a schematical representation of a document imaging system according to an exemplary embodiment of this disclosure.

As shown in FIG. 1, air is drawn by a blower 30 attached to an outlet filter 35 through an inlet filter 25, the vacuum slot and through the concertina tube 20. The vacuum ducting 20 air flow provides multiple functions, by inducing an airflow, the scan bar light source 10 is cooled, an air curtain is created between the light source 10 and the potentially heat sensitive optical sensor 15, and both the scan bar lens optical sensor 15 and the light source 10 are cleaned. In addition, the underside of the platen glass 5 is also cleaned by a relatively low velocity movement of air.

Figure 2:
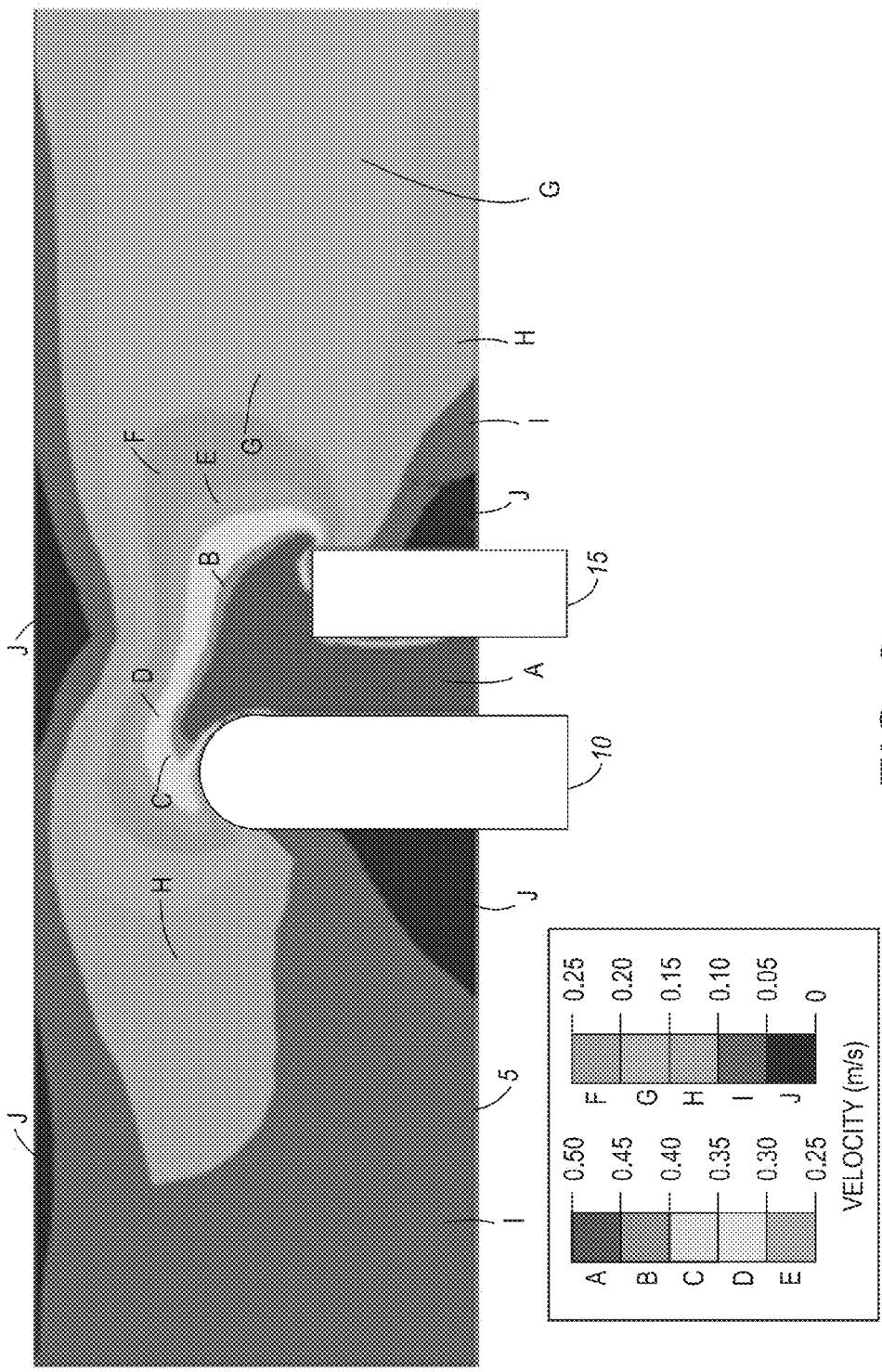
FIG. 2 is a fluid dynamic analysis plot of a document imaging system represented by FIG. 1.

With reference to FIG. 2, a computational fluid dynamic analysis plot shows a slice through the scan bar with contours colored by velocity magnitude. The high velocity region A between the light source 10 and the optical sensor 15 provides thermal separation. The medium velocity flows across the surfaces of the light source and optical sensor, as well as the platen glass underside, and provides a contamination pick-up and collection function.

Figure 3:
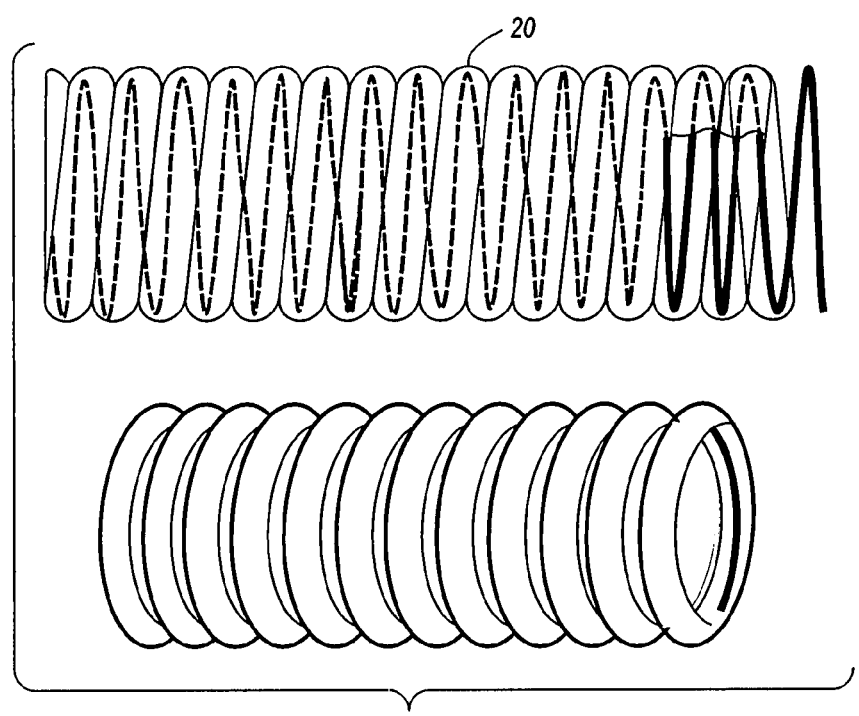
FIG. 3 is an illustration of a collapsible tube/duct according to an exemplary embodiment of this disclosure.

FIG. 3 provides a more detailed view of a concertina tube 20 according to an exemplary embodiment of this disclosure.

Figure 4:
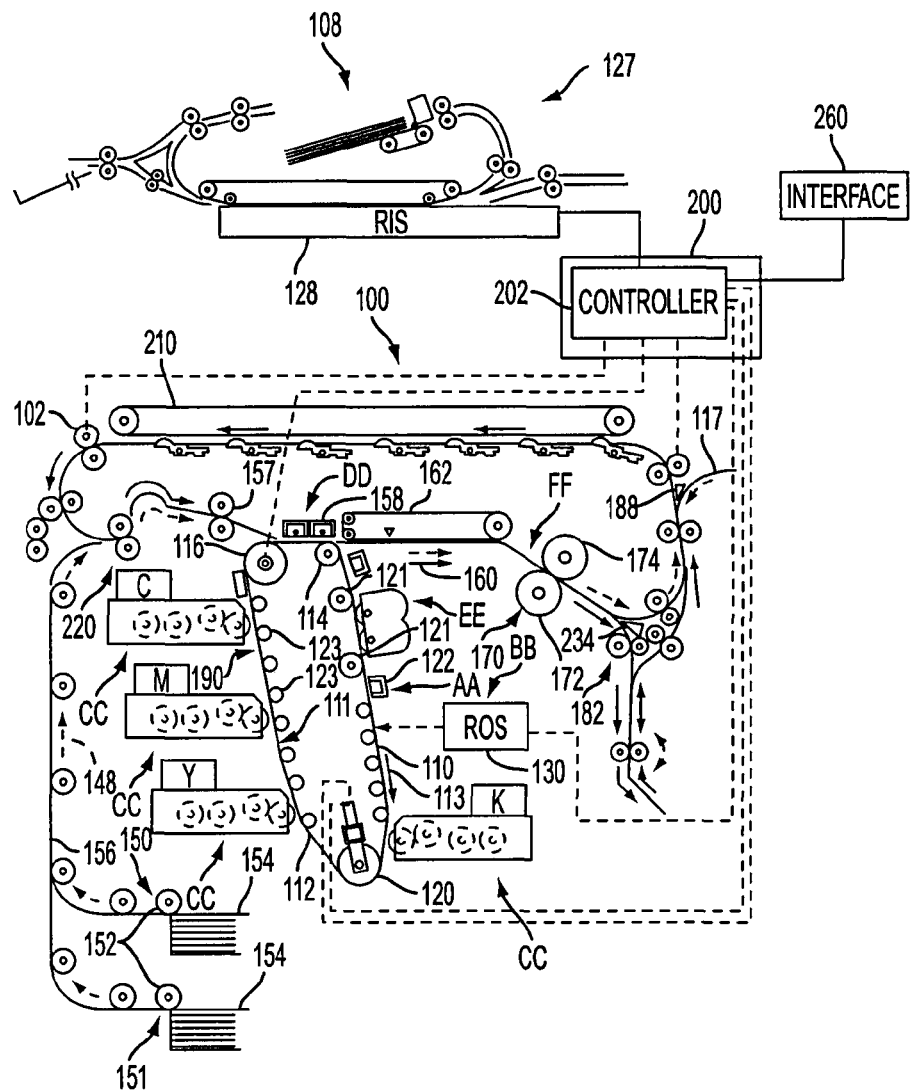
FIG. 4 is a schematic of an image scanning apparatus, according to an exemplary embodiment of this disclosure, used in conjunction with a printing apparatus.

FIG. 4, schematically illustrates an apparatus including a scanner according to an exemplary embodiment of this disclosure in a toner image producing machine such as a copier, printer, or multifunction device shown in the form of an electrostatographic reproduction machine 108 which is sometimes referred to herein as an image output terminal (IOT). In the machine 108, an original document is positioned in a document handling module 127 on a raster input scanner (RIS) module indicated generally by reference numeral 128. The RIS module 128, for example, contains document illumination lamps, optics, a mechanical scanning drive and a charge coupled device (CCD) array. The RIS module 128 operates to capture the entire original document and converts it to a series of raster scan lines. This information is transmitted to a control module 200 that includes an electronic subsystem (ESS) processor 202 that controls a raster output scanner (ROS) 130.

The machine 108 generally employs a photoreceptor module 190 including a photoconductive member, such as a belt 110. The photoconductive belt 110 can be made from a photoconductive material coated on a ground layer which, in turn, is coated on an anti-curl backing layer. The belt 110 moves in the direction of arrow 113 to advance successive portions sequentially through the various processing stations disposed about the path of movement thereof. Belt 110 is entrained as a closed loop 111 about a stripping roll 114, a drive roll 116, and an idler roll 121.

Initially, a portion of the photoconductive belt surface passes through a charging station AA. At the charging station AA, a corona generating device indicated generally by the reference numeral 122 charges the photoconductive belt 110 to a relatively high, substantially uniform potential. At an exposure station BB, the controller or electronic subsystem (ESS) processor 202, receives image signals from the RIS 128 representing the desired output image and processes these signals to convert them to a continuous tone or gray scale rendition of the image which is transmitted to a modulated output generator, for example the raster output scanner (ROS), indicated generally by reference numeral 130.

The ROS 130 includes a laser with rotating polygon mirror blocks. For example, a nine-facet polygon could be used. The ROS 130 illuminates the charged portion on the surface of the photoconductive belt 110 at a resolution of about 300 or more pixels per inch. The ROS will expose the photoconductive belt 110 to record an electrostatic latent image thereon corresponding to the continuous tone image received from the ESS processor 202. As an alternative, the ROS 130 may employ a linear array of light emitting diodes (LEDs) arranged to illuminate the charged portion of the photoconductive belt 110 on a raster-by-raster basis.

After the electrostatic latent image has been recorded on the photoconductive surface 112, the belt 110 advances the latent image to a development station CC, which includes four development modules as shown each having developer units containing CMYK color toners, in the form of liquid or dry particles. As is well known, the CMYK color toners are electrostatically attracted to the latent images using commonly known techniques.

After the electrostatic latent image is developed, the toner powder image present on the belt 110 advances to the transfer station DD. A print sheet 148 is advanced to the transfer station DD, by a sheet feeding module or apparatus 150, 151. The sheet feeding apparatus 150, 151 includes a feed roll 152 contacting the uppermost sheet of the stack 154. The feed roll 152 rotates to advance the uppermost sheet from the stack 154 to the sheet transport 156. The sheet transport 156 directs the advancing sheet 148 of support material into the registration assembly 157 and then into the image transfer station DD to receive a toner image from the photoreceptor belt 110 in a timed sequence. The toner image on the image bearing surface 112 of the belt 110 contacts the advancing sheet 148 at transfer station DD. The transfer station DD includes a corona generating device 158, which sprays ions onto the backside of sheet 148. This attracts the toner image from the photoconductive surface 112 to the sheet 148. After image transfer as such, the sheet 148 continues to move in the direction of arrow 160 by way of the belt transport 162, which advances the sheet 148 to the fusing station FF.

The fusing station FF includes a fusing module indicated generally by the reference numeral 170 which permanently affixes the transferred toner power image to the copy sheet. Preferably, the fusing module 170 includes a heated fuser roller 172 and a pressure roller 174 with the powder image on the copy sheet contacting fuser roller 172. The pressure roller is biased against the fuser roller to provide the necessary pressure to fix the toner powder image to the copy sheet. The fuser roll is internally heated by a quartz lamp (not shown). A release agent, stored in a reservoir (not shown), is pumped to a metering roll (not shown). A trim blade (not shown) trims off the excess release agent. The release agent transfers to a donor roll (not shown) and then to the fuser roll 172.

The sheet then passes through the fusing module 170 where the image is permanently fixed or fused to the sheet. After passing through the fusing module 170, a gate 188 either allows the sheet to move directly via an output 117 to a finisher or stacker, or deflects the sheet into the duplex path 100, specifically, first into a single sheet inverter 182. That is, if the second sheet is either a simplex sheet, or a completed duplexed sheet having both side one and side two images formed thereon, the sheet will be conveyed via gate 188 directly to the output finishing module (260, FIG. 4) via output path 117.

However, if the sheet is being duplexed and is then only printed with a side one image, the gate 188 will be positioned to deflect that sheet into the inverter 182 and into the duplex loop path 100, where that sheet will be inverted and then fed to the acceleration nip 102 and belt transports 210, for recirculation back through the transfer station DD and the fusing module 170 for receiving and permanently fixing the side two image to the backside of that duplex sheet, before it exits via the exit path 117.

After the print sheet is separated from the photoconductive surface 112 of the belt 110, the residual toner/developer and paper fiber particles adhering to photoconductive surface 112 are removed therefrom at a cleaning station EE. The cleaning station EE includes a rotatably mounted fibrous brush in contact with the photoconductive surface 112 to disturb and remove paper fibers and a cleaning blade to remove the non-transferred toner particles. The blade may be configured in either a wiper or doctor position depending on the application. Subsequent to cleaning, a discharge lamp (not shown) floods the photoconductive surface 112 with light to dissipate any residual electrostatic charge remaining thereon prior to the charging thereof for the next successive imaging cycle.

Figure 5:
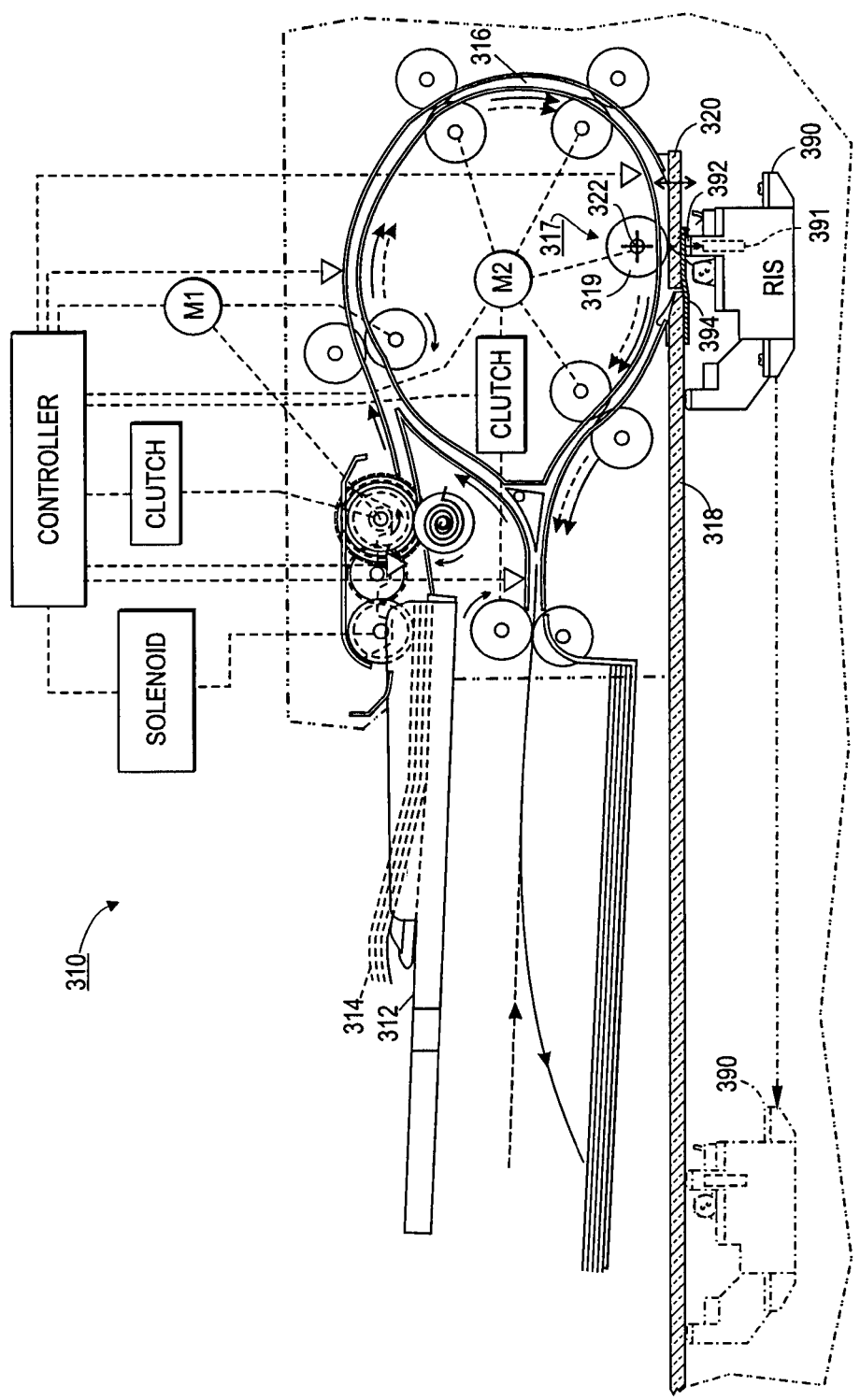
FIG. 5 is a schematic of a document handler incorporating a scanning apparatus according to an exemplary embodiment of this disclosure.

A detailed example of a full width array (FWA) constant velocity transport (CVT) scanner/document handler is shown in FIG. 5, which is similar to an automatic document feeder disclosed in U.S. Pat. Nos. 5,339,139 and 6,593,995, the complete disclosures of which are incorporated herein by reference. More specifically, in FIG. 5 there is shown a dual mode document handler 310. Document sheets 314 to be imaged while moving may, as shown in FIG. 5, be automatically individually fed from a stack of sheets in an input tray 312 by a document feeder into sheet path 316 to the CVT imaging station 317, where a CVT transport roller 319 engages and feeds the sheet 314 at a constant velocity while pressing the imaged area of the sheet 314 against the upper surface of the small (narrow) transparent glass imaging platen 320 for imaging by the RIS imaging optics unit 390. The RIS is part of a known type of imaging unit 390 having slide pads 392 providing a low friction surface. The structure also includes an imager bar 391, which may be a conventionally, commercially available, full document width array of multiple CCD photosites raster input scanner (RIS). Similarly, the structure includes transitioning strips 394 of flexible and relatively low friction material to the bottom side of platens, inboard and outboard, outside of the imaging station area. These slide pads 392 are biased to maintain engagement with the bottom surface of the platen 320, to thus maintain a consistent focal distance from the upper surface of the (floating) platen 320, and hence from the document 314 being imaged.

Although a single roll 319 (or common axis plural rolls) CVT is shown, it will be appreciated that there are other known CVT systems in which there is a pair of CVT rolls spaced on opposite sides of the imaging area 317 and a floating baffle holds the document down against the platen in imaging area.

When scanning a stationary document, the large platen 318 is used. This scanning is performed by the same single optics unit 390 and its slide pads 392 moving under that other platen 318, as shown by the movement arrow and phantom line position thereof. For each return to the first mode of automatic document feeding and scanning, the optics unit 390 must then return back to its imaging station 317 position.

Figure 6:
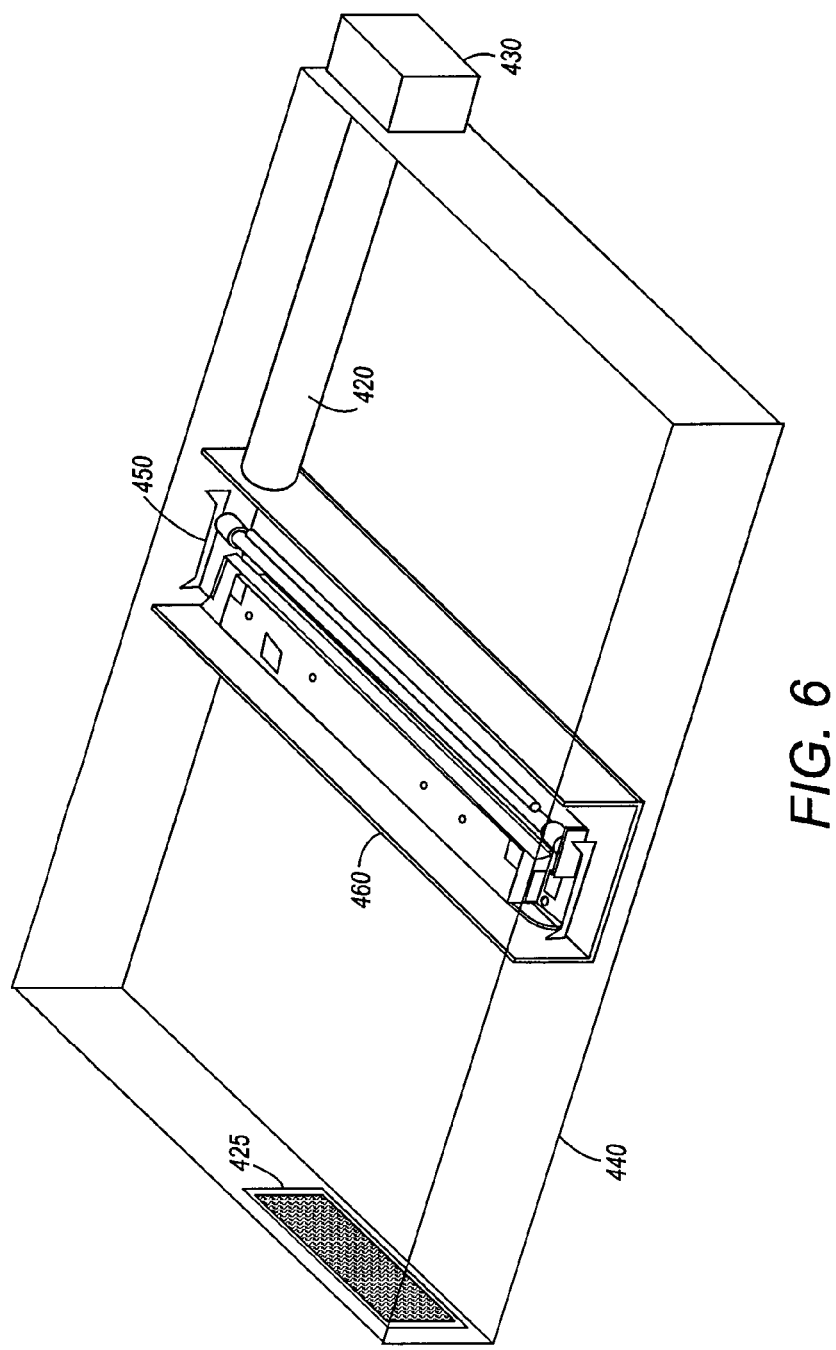
FIG. 6 shows a document imaging system including a cooling and/or and/or cleaning system according to an exemplary embodiment of this disclosure.
Figure 7:
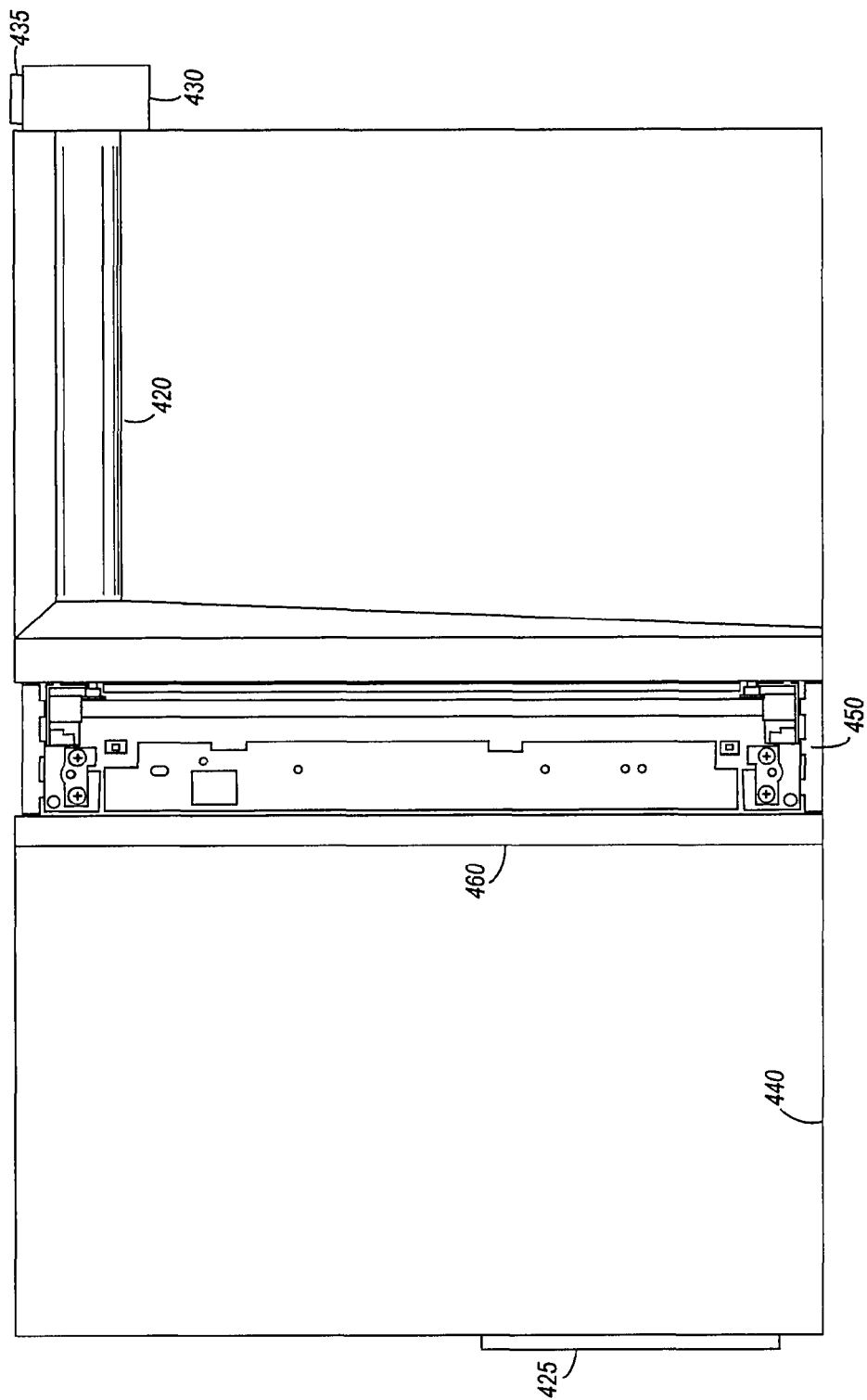
FIG. 7 is another view of the document imaging system illustrated in FIG. 6, including a cooling and/or cleaning system according to an exemplary embodiment of this disclosure.

With reference to FIG. 6 and FIG. 7, illustrated is an exemplary embodiment of a cooling and cleaning system according to this disclosure which can be incorporated into the image scanning apparatus of FIG. 4 and/or document handler of FIG. 5.

The cooling and cleaning system includes a scanner assembly 450, a scanner tub 440, an air inlet filter 425 and a blower 430. In addition, the air blower 430 is connected to a flexible tube 420, which connects to a duct 460, enclosing the scanner assembly. An imaging platen (not shown) is positioned on top of the scanner tub. In operation, the scanner assembly traverses along the longitudinal axis of the imaging platen and scanner tub, while the flexible tube expands and contracts appropriately. Air is drawn through the inlet filter 425, along the underside of the imaging platen and through the vacuum slot between the light source and optical sensor and into the interior of the duct 460 which substantially draws air from the bottom of the vacuum slot through the flexible tube 420 and out the blower 430. The air flow provides cleaning of the imaging platen underside, as well as cooling of various components within the scanner assembly, including the light source and optical sensor.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A document imaging system comprising:
    a document handler;
    an imaging platen operatively associated with the document handler, the imaging platen including a longitudinal axis, a lateral axis, a top surface and an underside surface;

a tub attached to the imaging platen, whereby the underside surface is substantially sealed within the tub, the tub including an inside cavity, an outside surface, an air inlet and an air outlet;

a light source aligned along the lateral axis of the imaging platen and located within the inside cavity of the tub;

an optical sensor longitudinally offset from the light source and aligned along the lateral axis of the imaging platen and located within the inside cavity of the tub;

a slot aligned along the lateral axis of the imaging platen and bounded by the light source and optical sensor, the slot located within the inside cavity of the tub and operatively connected to the air outlet;

a blower operatively connected to the air outlet, wherein the blower draws air from the air inlet, along the underside surface of the imaging platen, through the slot and through the air outlet to provide one or more of cooling and cleaning of any surfaces within the tub.

2. The document imaging system according to claim 1, wherein the document imaging system is associated with one of a copy machine, a scanner, a printer and a MFD (Multi-function Device).

3. The document imaging system according to claim 1, wherein the imaging platen is glass.

4. The document imaging system according to claim 1, wherein the air inlet is operatively connected to a first filter and the air outlet is operatively connected to a second filter.

5. The document imaging system according to claim 1, further comprising:
    a collapsible ducting operatively connected to the air outlet and the slot; and
    a carriage operatively connected to the light source and the optical sensor, the carriage configured to run along the longitudinal axis of the imaging platen.

6. The document imaging system according to claim 5, wherein the carriage is run along the longitudinal axis of the imaging platen to dynamically change the air flow along the underside of the imaging platen and thereby provide cleaning of the entire underside of the imaging platen.

7. The document imaging system according to claim 1, wherein the light source is a LED bar.

8. The document imaging system according to claim 1, wherein a relatively higher velocity air flow occurs through the slot, relative to the velocity of the air flow along the imaging platen underside.

9. The document imaging system according to claim 1, wherein the document handler is a constant velocity transport (CVT).

10. The document imaging system according to claim 1, wherein the slot is a vacuum slot.

11. A document imaging system comprising:
    a document handler;
    an imaging platen operatively associated with the document handler, the imaging platen including a top surface and an underside surface;
    a tub attached to the imaging platen, whereby the underside surface is substantially sealed within the tub, the tub including an inside cavity, an outside surface, an air inlet and an air outlet;
    a light source and optical sensor assembly located within the tub inside cavity, the light source and optical sensor assembly configured to scan a document placed on the imaging platen; and
    a blower operatively connected to the air outlet and the light source and optical sensor assembly,
    wherein the blower draws air from the air inlet, across the imaging platen underside, across the light source and optical sensor assembly, and out the air outlet.

12. The document imaging system according to claim 11, wherein the document imaging system is associated with one of a copy machine, a scanner, a printer and a MFD (Multi-function Device).

13. The document imaging system according to claim 11, wherein the imaging platen is glass.

14. The document imaging system according to claim 11, wherein the air inlet is operatively connected to a first filter and the air outlet is operatively connected to a second filter.

15. The document imaging system according to claim 11, further comprising:
    a collapsible ducting operatively connected to the air outlet and the slot; and
    a carriage operatively connected to the light source and the optical sensor, the carriage configured to run along the longitudinal axis of the imaging platen.

16. The document imaging system according to claim 15, wherein the carriage is run along the longitudinal axis of the imaging platen to dynamically change the air flow along the underside of the imaging platen and thereby provide cleaning of the entire underside of the imaging platen.

17. The document imaging system according to claim 11, wherein the light source is a LED.

18. The document imaging system according to claim 11, wherein a relatively higher velocity air flow occurs through the light source and optical sensor assembly, relative to the velocity of the air flow along the imaging platen underside.

19. The document imaging system according to claim 11, wherein the document handler is a constant velocity transport (CVT).

20. The document imaging system according to claim 11, wherein a vacuum is created between the light source and the optical sensor.

* * * * *